May 7, 1968  T. G. HART  3,381,739
METHOD AND APPARATUS FOR PROCESSING MATERIALS
INTO FOIL AND STRIP FORM
Filed Aug. 20, 1965  4 Sheets-Sheet 1

INVENTOR.
THOMAS G. HART
BY
Davis, Hoxie, Faithfull & Hapgood
ATTORNEYS.

May 7, 1968

T. G. HART 3,381,739

METHOD AND APPARATUS FOR PROCESSING MATERIALS
INTO FOIL AND STRIP FORM

Filed Aug. 20, 1965

INVENTOR.
THOMAS G. HART
BY
*Davis, Hoxie, Faithfull & Hapgood*
ATTORNEYS.

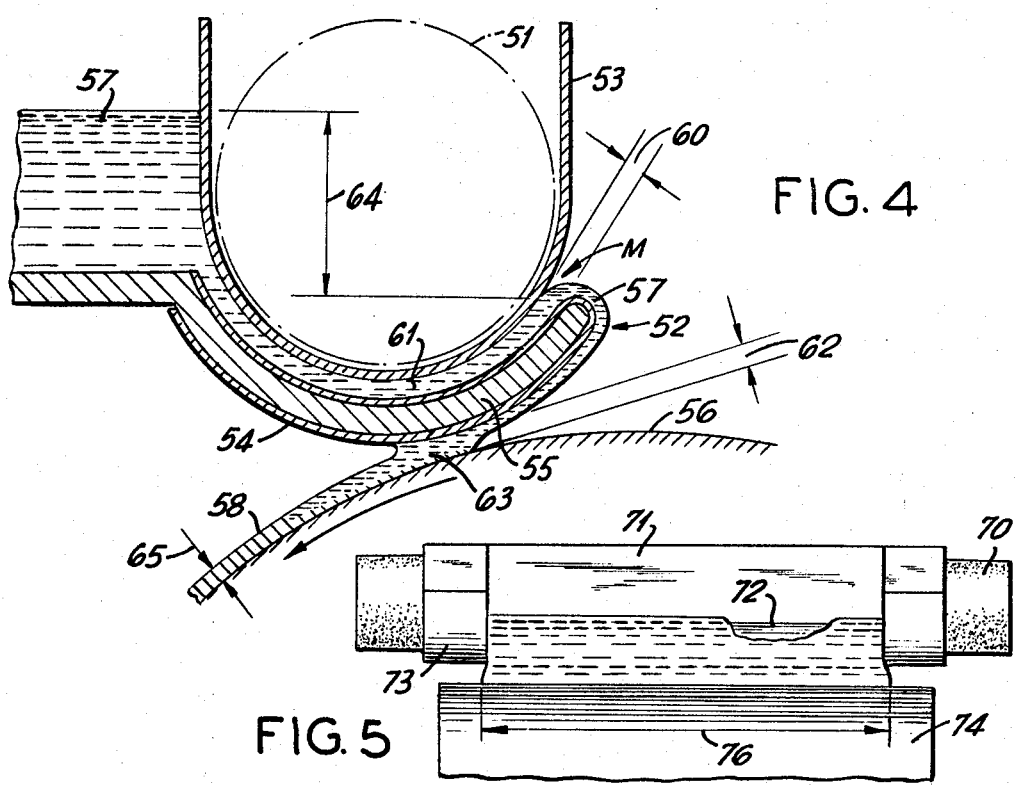
FIG. 4
FIG. 5
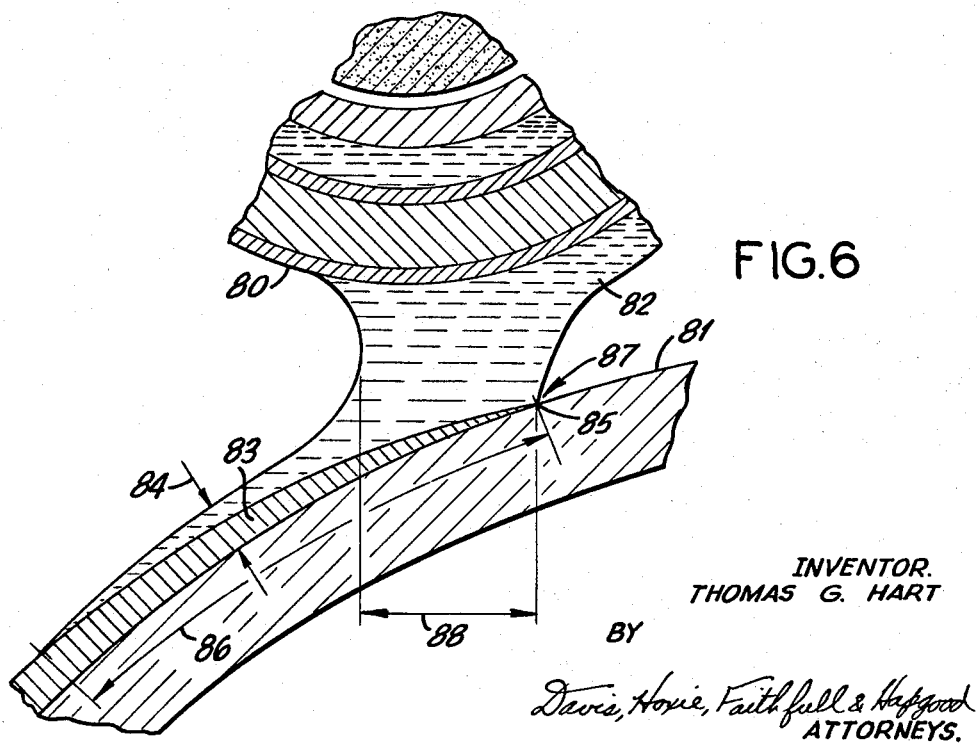
FIG. 6
INVENTOR.
THOMAS G. HART
BY
Davis, Hoxie, Faithfull & Hapgood
ATTORNEYS.

United States Patent Office 3,381,739
Patented May 7, 1968

3,381,739
METHOD AND APPARATUS FOR PROCESSING MATERIALS INTO FOIL AND STRIP FORM
Thomas Gordon Hart, San Francisco, Calif., assignor to Phelps Dodge Corporation, New York, N.Y., a corporation of Delaware
Filed Aug. 20, 1965, Ser. No. 481,339
24 Claims. (Cl. 164—64)

ABSTRACT OF THE DISCLOSURE

A method and apparatus for forming sheet or strip material by flowing liquid through an elongated channel and on to a surface which is wet by the liquid, and causing the liquid to form a bridge between that surface and a moving surface adjacent to that surface to coat the moving surface with a film of liquid which is solidified and stripped from the moving surface as a continuous sheet.

---

This invention relates generally to the manufacture of foil and strip and particularly to the manufacture of continuous lengths of metal foil and strip. More particularly the invention relates to the manufacture of continuous lengths of metal foil and strip from molten metal.

Broadly the invention comprises means for continuously coating liquid material on to a moving surface so as to allow subsequent solidification and removal of the coated material continuously from the moving surface as a continuous length of foil and strip.

In the present context "foil" means sheetlike material having a thickness between a fraction of a thousandth and a few thousandths of an inch and "strip" means sheetlike material having a thickness between a few thousandths and a few tens of thousandths of an inch. A "continuous length" of foil or strip means an arbitrary length of foil or strip limited as a matter of convenience and not by limitation of the manufacturing process.

Numerous processes for manufacturing foil and strip of both metals and non-metals are of course well known and some are well established commercially. Confining attention to metal strip and foil which are the especial concern of the present invention, the most widely used foil manufacturing process is that of "rolling." In the rolling process a metal slab is successively reduced in thickness and increased in area by successive passages between rollers. This rolling process is entirely satisfactory for producing thick strip but somewhat less than satisfactory for producing thin strip and foil. The main difficulty with the rolling process for manufacturing foil is that to maintain uniformity of foil thickness as thickness decreases generally requires proportionate reduction in foil width which is to say the thinnest foil can be satisfactorily rolled only in very narrow width. The reason for this width difficulty with the rolling process is that the problems of maintaining small clearance accurately between two rollers increase exponentially with roller width. Hence, for example, whereas to produce copper foil one thousandth of an inch thick and a few inches wide by rolling process is relatively easy, to produce copper foil of the same thickness but several feet wide by rolling process is relatively difficult. Consequently, because a considerable demand for wide foils, particularly copper foil, has developed in recent years, alternatives to the rolling process for manufacturing foil have received widespread attention. In the case of copper foil, for example, by far the most successful of these alternative foil manufacturing processes to date has been that of electrolytically depositing a copper coating onto a moving surface so as then to remove the coating as foil. This electrolytic-coating foil-process produces copper foil of thickness down to a fraction of a thousandth of an inch in widths up to several feet. The quality of copper foil produced by the electrolytic-coating foil-process of course ultimately depends upon the quality of of the anode copper and of the electrolytic tank chemicals used. Even using the best available grades of anode copper and tank chemicals, the quality of the electrolytically produced copper foil is still somewhat below the highest grade of foil that can be produced by rolling out the highest grade of copper slab. That is to say, in the case of copper for example, the electrolytic-coating foil-process while overcoming the width difficulty of the rolling process does not usually produce as high a quality of foil. In fact, for a number of the applications of wide copper foil, notably those requiring very high electrical conductivity and substantially complete freedom from mechanical imperfections such as pin holes, the quality of foil produced by the electrolytic-coating foil-process is less than adequate. Accordingly, widespread attention has been lately directed toward further alternative processes for manufacturing foil, particularly copper foil, with a view to overcoming both the width limitation of the rolling process and the quality deficiency of the electrolytic process. The principle of coating a surface so as subsequently to remove the coating from the surface as foil, as has been commercially established in the electrolytic-coating foil-process outlined above, can obviously be applied to convert almost any coating process into a foil manufacturing process. A number of other foil-manufacturing-processes which share with the electrolytic foil-process the principle of coating material onto a moving surface so as then to be stripped as foil are hence based on well known coating-processes. These other foil processes which may be regarded as obvious adaptions of well known coating processes in view of the electrolytic coating foil-process include the pyrolytic-coating foil-process, the powder-coating foil-process, the vapor-coating foil-process and the liquid-coating foil-process. Most closely akin to the electrolytic coating foil-process is the pyrolytic-coating foil-process in which a chemical vapour containing the foil material as a constituent is decomposed by heat at the moving surface so as to coat foil material on the surface. This pyrolytic foil process, when used for copper foil, has much the same advantages and disadvantages as the electrolytic process which is to say there is no width limitation but there is a quality potential somewhat less than the rolling process. Widely different from either the electrolytic-coating foil-process or the pyrolytic-coating process, in that foil material is coated directly without chemical action, are the three "direct-coating" foil-processes of powder-coating, vapor-coating and liquid-coating. In the powder-coating process a moving surface is coated with powdered material which is then melted together and removed as foil. In the vapor-coating foil-process vaporised material is condensed on a moving surface to form a coating which is then removed as foil. In the liquid-coating foil-process a moving surface is coated with liquid material which is then solidified and removed as foil.

The above mentioned three direct-coating foil-processes all have intrinsic potential of producing the highest quality of foil without limitation as to width from a variety of materials. However, so far as is known, none of the three direct-coating foil-processes has yet been commercially used for the manufacture of wide metal foils for the reason that the considerable difficulties which are encountered in implementing these three direct-coating foil-processes have not yet been overcome on a commercial scale. As will be explained later, if satisfactory means for applying the coatings are available for each of the three direct-coating foil-processes, the liquid-coating foil-process has fewer implementation difficulties than either the powder-coating foil-process or the vapor-coating foil-process. However, as will also be explained later, satisfactory method and apparatus for applying liquid-coatings appropriate to foil manufacturing purposes have not hitherto been readily available for molten metals and more particularly for molten copper. Hence is will be understood that, hitherto, the non-availability of satisfactory liquid-coating means has been the main impediment to commercial manufacture of foil by liquid-coating foil-process, particularly metal foil and more particularly copper foil. Hence, further, it will be understood that to provide a commercially satisfactory liquid-coating-means is the key to providing a commercial process for manufacturing wide high-quality foil which has intrinsic advantages over the presently used electrolytic, pyrolytic and rolling foil-processes and which would have operational advantages over the powder-coating and vapor coating foil-processes were these two processes to be commercially implemented, particularly for metal foils and more particularly for copper foil. Accordingly, toward the broad object of the present invention which is to provide better means for manufacturing foil and strip, a subsidiary broad object is to provide means for liquid-coating which are appropriate to foil manufacturing purposes. Somewhat narrower objectives of the present invention are as follows:

First, to provide better means for manufacturing foil and strip of non-metallic materials which may be obtained in liquid form but which may subsequently be solidified;

Second, to provide means for manufacturing metal foil and strip by liquid-coating process;

Third, to provide means for manufacturing foil and strip with greater economy than hitherto;

Fourth, to provide means for manufacturing wide copper foil and strip having higher quality than hitherto;

Fifth, to provide means for manufacturing thin, high quality copper foil in greater width than hitherto;

Sixth, to provide means for manufacturing foil and strip in continuous lengths; and Seventh, to provide preferred apparatus for manufacturing metal foil and strip, particularly copper foil and strip, by liquid-coating foil process.

These above and other objects of the present invention as well as the advantages of the invention with respect to the prior art will be understood from the following descriptions and drawings of which:

A is a discussion of the general principles of the three direct-coating foil processes;

B is a description of preferred means for foil manufacture in accordance with the present invention;

FIGURE 4 is an enlarged cross-sectional view of part of the apparatus of FIGURE 3;

FIGURE 5 is a front view of the apparatus of FIGURE 4 illustrating how foil width is determined;

FIGURE 6 is an enlarged cross-sectional view of part of FIGURE 4 showing details of the solidification aspects of the liquid-coating foil-process.

A. *General principles of "direct-coating" foil processes*

Figure 1:
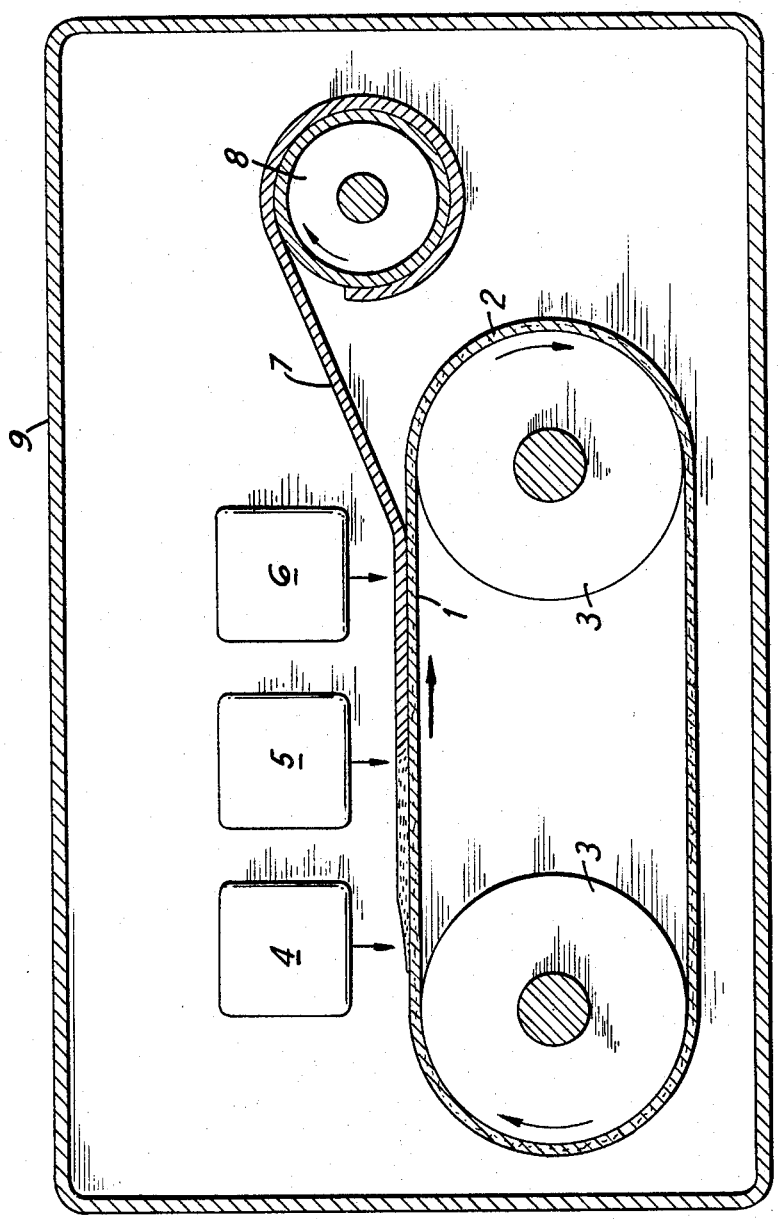
FIGURE 1 is a diagrammatic illustration of apparatus for manufacturing foil by direct-coating process.

As outlined in the introduction, the three direct-coating processes for manufacturing foil are powder-coating, vapor-coating and liquid-coating. Broadly speaking these three foil processes can all be implemented by the general apparatus which is diagrammatically illustrated in FIGURE 1. With reference to figure 1, 1 is the general moving surface onto which the material is coated by any of the three coating methods and, for example, is shown as part of an endless belt 2 supported and driven by two rollers 3. 4 is the general coating means for applying the coating. 5 is the general solidifying means for solidifying the coating applied by 4, 6 is the general stripping means for removing the coating from surface 1. 7 is the removed coating now termed foil. 8 is the storage roller for storing the foil 7, and 9 is an enclosure around the whole apparatus. As stated in the introduction the broad methods of foil manufacture by respectively powder-coating, vapor-coating or liquid coating a moving surface and then stripping the solidified coating from the surface may be regarded as obvious adaptations of well known coating processes in view of the electrolytic-coating foil-processes and hence the general apparatus of FIGURE 1 may be regarded as a diagrammatic illustration of these three broadly obvious foil manufacturing methods.

Somewhat less broadly, with further reference to FIGURE 1; in the case of powder coating, coating-means 4 may be, for example, the well-known powder-coating-means of a hopper containing powdered material so contrived as to sprinkle the powdered material uniformly and at a measured rate onto surface 1, solidifying means 5 may be, for example, a furnace enveloping a portion of surface 1 and regulated so as to fuse together the coating of powdered material sprinkled on surface 1 by coating means 4, and stripping means 6 may be, for example, a knife edge bearing against surface 1 and relying somewhat on a lack of adhesion between surface 1 and the fused coating in order to accomplish the stripping action. In order to prevent contamination during the powder coating process, enclosure 9 may, for example, be filled with an inert atmosphere such as nitrogen.

In the case of vapor-coating, coating means 4 of FIGURE 1 may be, for example, the well known vapor coating means of a crucible, containing the material to be coated, heated to a temperature at which there is substantial evaporation of the material from the crucible. With this crucible type of vapor-coating-means a better location for coating-means 4 would be below the lower part of endless belt 2 rather than above the upper part as indicated in FIGURE 1. Correspondingly, in this vapor-coating case, solidifying means 5 may be, for example, merely an extensive, heat-adsorbtive, cooled surface parallel and close to moving surface 1 for extracting heat from surface 1 so as to facilitate condensation and subsequent solidification on surface 1 of the evaporated material issuing from coating-means 4, and stripping-means 6 may be, for example, merely the self stripping action of the solidified coating once removal has commenced and the solidified coating is led away from surface 1 as foil 7. Again, the stripping action would rely somewhat upon the fact that there is only limited adhesion between surface 1 and the solidified coating, as in the knife edge example above. In order to prevent contamination during the vapor-coating process, an inert atmosphere having very low pressure compared to atmospheric pressure may, for example, be used in enclosure 9; this very low pressure atmosphere also facilitates the evaporation of material from coating means 4.

With yet further reference to FIGURE 1 in the case of liquid coating, coating means 4 may be, for example, a well-known liquid coating means of a spray for spraying liquid particles onto moving surface 1. Solidifying means 5 may be, for example, merely an arrangement for cooling rollers 3 so that rollers 3 in turn cool endless belt 2 which in turn cools and solidifies the coating of liquid particles, and stripping means 6 may be, for example, merely a jet of gas directed so as to lift the solidified coating from the moving surface 1, again relying, as in the case of stripping means of the previous examples, on a somewhat limited adhesion between the solidified coating and surface 1. To avoid contamination enclosure 9 may, for example, be filled in this case with an inert atmosphere such as argon.

It will be understood from the above three particular examples of the broad apparatus of FIGURE 1, for manufacturing foil by powder-coating, vapor-coating and liquid coating, that conventional means are available for manufacturing foil by each of the three direct-coating foil processes. Furthermore, it will be noted from the above three examples that, in respect of solidifying means 5, stripping means 6 and contamination-avoiding means by atmosphere control in enclosure 9, the same conventional means may interchangeably serve all three coating processes to some extent. Hence it will be understood that the three direct-coating foil processes may be broadly compared without recourse to novel teachings.

A broad comparison, made on the basis of manufacturing copper foil, reveals, for example, that something over ten times as much heat is required to make a pound of foil by vapor-coating process as by liquid or powder-coating process. This high heat-consumption by the vapor-coating foil process, which is due of course to the high latent heat of vaporisation of copper, is doubly significant in that this large amount of heat must be both supplied in the coating-means and then withdrawn in the solidifying-means. Hence the relatively very-high-heat-consumption of the vapor-coating foil-process leads to double disadvantage and results, generally speaking, in an equipment cost, per pound of foil produced, considerably in excess of that for the powder or liquid-coating foil processes. The broad comparison between the three processes also reveals, for further example in the case of copper foil, that, whereas in the powder and liquid-coating foil process there is a choice available between very low pressure atmosphere and normal pressure inert atmosphere as the contamination avoiding means, the vapor-coating foil process almost certainly requires a very low pressure atmosphere in order to achieve useful vaporisation rates. Use of a normal pressure inert atmosphere instead of a very low pressure atmosphere as the contamination avoiding means requires much simpler equipment and furthermore allows use of numerous techniques such as gas cooling in the solidifying means and gas lifting in the stripping means which are difficult or impossible in very low pressure atmosphere. Hence the necessity of a very low pressure atmosphere in the vapor-coating foil process is a further disadvantage of this process and, like the relatively very high heat consumption mentioned above, results generally speaking, in a much higher equipment cost per pound of foil produced by vapor-coating process than by powder or liquid-coating process. The broad comparison between the three processes also reveals, for yet further example, that, whereas the vapor-coating foil process and the liquid-coating foil process require the moving surface only to be cooled to solidify the coatings, the powder-coating foil process requires the moving-surface to be heated as well as cooled so as to solidify the coating. This requirement for both heating and cooling the moving surface in the powder-coating foil process of course requires a somewhat more extensive moving surface than just cooling alone and, practically speaking, precludes the use of the surface of a rotating drum which is an obvious alternative to the endless belt, shown in FIGURE 1, for the vapor and liquid-coating processes.

It will by no be clear that conclusions can be drawn as to relative advantages and disadvantages of the three direct-coating foil processes without detailed examination of the various coating means, solidifying means, stripping means and contamination avoiding means. Hence it will be understood that there is broad basis for the statement that the liquid-coating foil process has greater potential in terms of equipment economy and production economy than either the vapor-coating or the powder-coating foil processes, particularly for copper foil. However, it will be equally understood that this greater potential of the liquid-coating foil-process, as compared to the vapor-coating and powder-coating foil-processes, depends upon the availability of liquid-coating means which are at least comparable in efficiency, so far as coating uniformity and quality are concerned, to available means for vapor-coating and powder-coating. So far as is known, liquid-coating means of such comparable efficiency have not hitherto been available, particularly for molten metals and more particularly for molten copper. Accordingly, in providing such comparably efficient liquid-coating means, the present invention enables the manufacturer of commercial foil to obtain good quality inexpensive foil by liquid-coating process and moreover with clear advantages over foil manufacture by vapor-coating or powder-coating processes were these two processes to be commercially implemented. Furthermore, since, as outlined previously, the liquid-coating foil process has neither the width limitation of the rolling process nor the quality limitation of the electrolytic or pyrolytic processes, liquid coating means in accordance with the present invention make possible a foil manufacturing process which is clearly superior to any known foil manufacturing process, particularly for wide, high-quality metal foils and more particularly for wide, high-quality copper foil.

The reasons for the unavailability hitherto of liquid coating means adequate for foil manufacturing purposes, the difficulties attendant in providing such means and how these difficulties are overcome by the present invention are explained below.

B. *Means for manufacturing foil and strip in accordance with the present invention*

As already outlined, a broadly obvious method for manufacturing foil and strip comprises applying a coating of liquid material onto a moving surface, subsequently solidifying the coating and then stripping the solidified coating from the moving surface as foil or strip. As also already outlined, this broadly obvious method is diagrammatically illustrated by FIGURE 1. It has also been pointed out that the impediment to use of this method for commercial manufacture of foil and strip has been the unavailability of liquid-coating means adequate for foil manufacture, particularly for metals such as copper, and that, accordingly, a purpose of the present invention is to provide improved coating means particularly for metals such as copper.

So far as is known the principal liquid coating means in present commercial use for metals such as copper is the liquid particle spraying means previously mentioned for sake of illustration in connection with FIGURE 1. Various types of these liquid particle spraying means are, of course, widely used commercially for applying metal coatings and other coatings for decorative and protective purposes. At first sight, it would appear that these widely known and well established liquid particle spraying means for applying decorative and protective coatings are adaptable for foil manufacturing purposes. However, there is at least one important difference between coatings for decorative and protective purposes and coatings for foil manufacturing purposes which has to be considered. Decorative and protective coatings are normally applied to adherent surfaces so as to ensure retention of the coatings whereas a coating suitable for foil manufacturing purposes is preferably applied to a non-adherent surface so as to facilitate stripping of the coating from the surface. Only if the coating adheres well to the surface can deficiencies in the coating such as non-uniformity and porosity be removed by "reflowing" the coating on the surface after the coating is applied. This is to say, in connection with the liquid-particle spraying means of applying a coating, that only if the coating adheres well to the surface as for decorative and protective purposes is it possible to use the method for attaining uniformity and freedom from porosity of keeping the liquid-particles liquid long enough after impacting the surface to flow together into a uniform coating and long enough for trapped gas, which would otherwise cause porosity, to escape, since if the adhesion between the surface and coating is low, as for foil manufacture, keeping the liquid-particles liquid for any length of time after impacting the surface results, generally, in the liquid-particles pulling together on the surface into globules. Hence, in general, it will be understood that the necessity to strip the coating, as for foil manufacture, mitigates against achieving uniformity and freedom from porosity in the coating by reflowing technique. Hence, further, in particular it will be understood that liquid particles spraying means are not adaptable to foil manufacturing purposes at least for the reason that these means do not furnish a coating on a surface of limited adhesion which is uniform enough nor free enough of porosity for foil purposes. In the general connection it may be noted that the tendency of a liquid-coating to form globules on a surface of low adherence is of significance also in vapor-applied coatings and powder-applied coatings since these coatings of course also pass through a liquid phase before solidification. In the vapor-coating foil process this "globulating-effect" can, for example, be the main limitation on the production rate since the liquid phase is unavoidably prolonged by the large amount of heat released at the surface by the vapor condensation. In the powder-coating foil process, on the other hand, the "globulating-effect" can, for example, be the main limitation on the quality of the foil by allowing the powder-particles only to be sintered together instead of being fully melted, resulting in appreciable porosity. It may be further noted that the aforementioned limitations on the production rate and quality potential of the vapor-coating and power-coating foil processes, due to the "globulating effect," are at best extremely difficult to overcome.

It will be understood that a coating means used successfully to apply decorative or protective coating is not necessarily suited to applying coating which is to be stripped as foil or strip. It will also be understood that the various liquid-particle spraying means presently known and used for furnishing coatings of metals such as copper for decorative, protective and other such purposes do not furnish coatings which are uniform enough nor free enough of porosity for foil purposes. Further, it will also be understood that since liquid-particle spraying-means are the only well known commercial coating means for metals such as copper, aside of course from liquid dipping means, liquid coating means suited to the manufacture of wide, high-quality foil of metals such as copper have not hitherto been commercially available. Moreover, it will be understood that the "globulating-effect" due to the low adherence between coating and coated surface, necessary in order that the coating be stripped, is a major difficulty to be overcome in devising satisfactory liquid-coating means for foil manufacture. Still further, it will be understood that the "globulating-effect" difficulty in vapor-coating and powder-coating means for foil manufacture would be quite difficult to overcome and that therefore, the vapor-coating and powder-coating foil processes are limited in production rate and quality by the "globulating-effect."

The means by which the present invention overcomes the "globulating-effect" difficulty and other difficulties so as to furnish an economical liquid-coating foil process for manufacturing wide, high-quality foil, particularly of metals such as copper, are described below.

Figure 2:
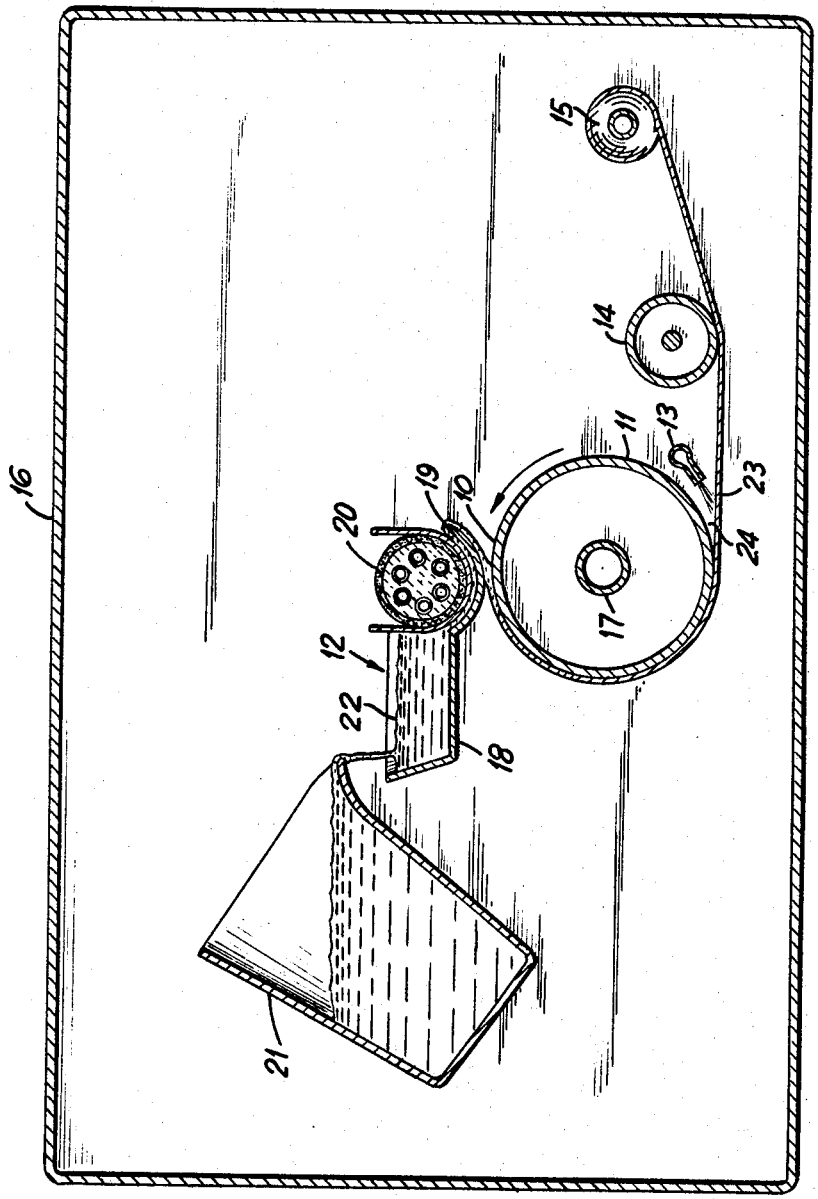
FIGURE 2 is a diagrammatis cross-sectional view of aparatus for manufacturing foil and strip in accordance with the present invention.

Attention is now directed to FIGURE 2 which illustrates diagrammatically, in cross-section view, a foil manufacturing apparatus which, being furnished with novel liquid-coating means in accordance with the present invention, is a particular and novel embodiment of the broadly described apparatus of FIGURE 1.

With reference to FIGURE 2 and with obvious connection with FIGURE 1, 10 is a moving surface consisting of the periphery of a rotating drum 11, 12 is a liquid-coating means in accordance with the present invention, 13 is a stripping means comprising, for example, a gas jet, 14 is a guide roll, 15 is a foil storage roll and 16 is an enclosure. Not shown in FIGURE 2 for sake of clarity is a solidifying means which may comprise, for example, merely an arrangement for cooling drum 11 by, for example, passing gas through the inside of drum 11 by way of hollow shaft 17.

In further detail of liquid-coating means 12 of FIGURE 2, 18 is a reservoir, 19 is a flow lip of reservoir 18, and 20 is a heater bar.

As already stated, FIGURE 2 is diagrammatic only and it will be understood therefore that a great number of subsidiary details necessary to a practical foil manufacturing apparatus are not shown for sake of clarity in the main details. These subsidiary details include supporting means, adjusting means and heating means for reservoir 18 and adjusting means and driving means for drum 11 and rollers 14 and 15. These subsidiary details further include, for example, additional rollers, foil guiding means and other means for starting, stopping and regulating the foil manufacturing process. Except insofar as the starting, stopping and regulating means apply to coating-means 12, as will be explained later, all these and other subsidiary details not shown in FIGURE 2 for sake of clarity may be understood to be of conventional nature in conventional or obvious combination.

With further reference to FIGURE 2, molten material 22 in reservoir 18 flows between heater bar 20 and the upper surface of lip 19, thence over the extremity of lip 19, thence down the underside of lip 19 and thence onto the cooled moving surface 10, thus continuously forming foil or strip 23. Foil or strip 23 is then separated from moving surface 10 in region 24 by action of gas jet 13 and is guided by roller 14 onto storage roller 15. The level of molten material in reservoir 18 is, for example, shown to be maintained by a holding vessel 21 which may be assumed to continuously replenish reservoir 18 at the same rate as material flows out of reservoir 18 to be converted to foil.

Figure 3:
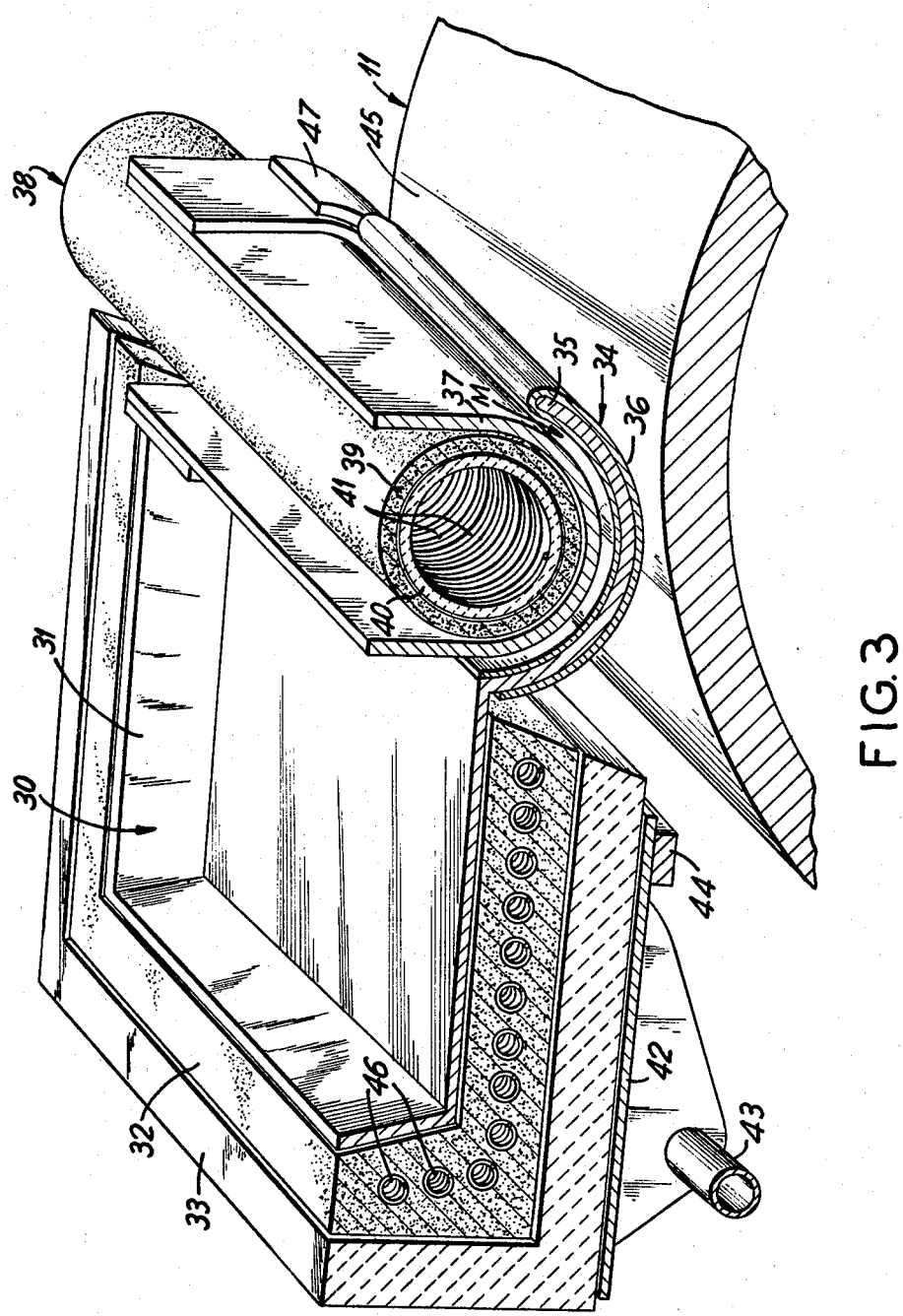
FIGURE 3 is a perspective view of liquid-coating apparatus in accordance with the present invention.

In order to describe the liquid-coating foil manufacturing process in accordance with the present invention in further detail attention is next directed to FIGURE 3 which illustrates in cross-sectional perspective view a preferred liquid-coating apparatus in accordance with the present invention. It will be noted that the liquid-coating apparatus of FIGURE 3 is somewhat different from coating-means 12 diagrammatically illustrated in FIGURE 2 but the similarity of operation of the two will be obvious.

With reference now to FIGURE 3 and in obvious connection with FIGURE 2, 30 is a reservoir, comprising tray 31, heater-shell 32 and insulator-shell 33. M is a flow mouth construction, the flow mouth construction M having a lip 34, which may be termed a lower lip, which lip includes an inner-section 35 which is an extension of tray 31 and an outer-section 36, the flow mouth construction M also having an upper section or upper lip 37. 38 is a heater-bar comprising outer-section 39, insulator-section 40 and heater-winding 41. 42 is a support-platform for reservoir 30, 43 is a support-shaft and 44 is a movable stop. In completion of the main detail of FIGURE 3, 45 is a part of the moving-surface of roller 11 of FIGURE 2 and 46 is one of a number of identical heater-elements in heater shell 32.

With further reference to FIGURE 3 the important constructional material features are as follows: Insulator-shell 33 is of any heat-insulating-type refractory-material appropriate to the temperature condition which is, of course, determined by the molten material or range of molten materials to be converted to foil. Heater shell 32 is of any refractory-material having good structural integrity under the temperature condition and good heat-conductive-ability. Tray 31, lower inner-section 35, lower outer-section 36 and upper-section 37 are of constructional materials which do not react with the molten-material and which have good structural-integrity at the temperature of the molten-material. Furthermore, lower inner-section 35 of lip 34, as well as end piece 47, is of constructional material that is not wet by the molten material whereas lower outer-section 36 is of constructional material that is wet by the molten-material. Outer-section 39 of heater-bar 38 is of any refractory material having good structural-integrity under the temperature condition and good heat-conductive ability. Insulator-section 40 of heater-bar 38 is of any electrically-insulating refractory-material appropriate to the temperature of the heater coil 41. Heater coil 41 is of any metal wire useable for resistance heating and appropriate to maintaining the temperautre of the molten-material over lip 34. Heating elements 46 of heater shell 32 are any tubular resistance-type heating-elements appropriate to maintaining the temperature of the molten-material in tray 31. Moving surface 45 (of drum 11, FIGURE 2) is of any material having limited adhesion to the molten-material under the condition that drum 11 is maintained at a temperature below the solidification point of the molten-material.

It will be understood of course that, in general, where such properties as non-corrosibility, wetting or nonwetting and limited adhesion are required of constructional materials, as above, these properties may often be obtained by appropriately "plating" materials which do not themselves have these desirable properties. For example, "chromium-plated" steel has the corrosion resistance of chromium rather than steel.

In the particular case that the molten-material is copper, which is to say copper-foil is to be manufactured, examples of materials, as specified above, for constructing the apparatus of FIGURE 3 are as follows: Insulator-shell 33 is of compacted magnesium oxide; heater-shell 32 is of compacted graphite; tray 31 is of molybdenum; lower-inner-section 35 is of molybdenum; upper-section 37 is of molybdenum; lower-outer-section 36 is of tungsten; outer-section 39 is of compacted graphite; insulator-section 40 is of compacted beryllium oxide, heater-coil 41 is of tungsten wire; heater elements 46 are compacted graphite rods and surface 45 is of steel.

In connection with the constructional material details outlined above, the following important general facts should be noted. In so far as corrosibility is concerned, impurities in the molten-material can very well react with constructional materials which do not react to the pure molten-material itself. Hence, in many cases, constructional materials suitable for use with pure molten-material are unsuited for use with impure molten-materials, depending of course on the types and amounts of impurities. Moreover, insofar as wetting or non-wetting and adhesive properties are concerned, constructional materials which possess these properties for pure molten-material need not possess these properties for impure molten-material especially if the impurities react with the constructional material so as to have surface-effect. Hence, in some cases, constructional materials which are suitable for use with impure molten materials from point of view that corrosion is negligible may be unsuitable for use from point of view that the deleterious effect upon such surface properties as wetting or non-wetting and adhesion is not negligible. Accordingly, in the examples above of construction materials suitable for use in the apparatus of FIGURE 3 for manufacturing copper foil, the assumption is made that the molten-copper contains no impurities which significantly react with molybdenum, tungsten and steel either from point of view of corrosion or from point of view of affecting the non-wetting property of molybdenum, the wetting property of tungsten or the limited adherence property of steel.

The significance of these above remarks regarding the effects of impurities in molten materials on constructional materials, particularly in connection with copper foil manufacture, will be more fully explained later.

Turning now to a description of the operation of the apparatus of FIGURE 3 it will be noted that the apparatus is shown in empty condition, which is to say with no molten material in tray 31 nor flowing over lip 34 nor flowing onto moving surface 45. From this empty condition a procedure for putting the apparatus into use is briefly as follows.

First, the enclosure surrounding the apparatus (enclosure 16 of FIGURE 2) is filled with inert atmosphere, for example nitrogen.

Next, heater coil 41 and heater elements 46 are turned on and tray 31, heater bar 38 and upper section or upper lip 37 heated to operating temperature which, for example, may be about 50° C. higher than the melting point of the molten material to be used. In the case of copper these parts may be heated, for example, to 1150° centigrade. However, beneficial results are achievable if these parts are heated to any temperature within the range 1100° centigrade to 1500° centigrade.

After the heating has occurred, stop-bar 44 is raised so as to tilt the bottom of tray 31 at an angle of about 10°; molten material is poured into tray 31 until molten material almost fills the gap between lower outer section 36 and upper section 37 and almost but not quite flows over lip 34; surface 45 is set into motion and the cooling means for surface 45 turned on; stop-bar 44 is lowered allowing molten material to flow from tray 31 through the gap between lower-outer-section 36 and upper section 37, over the edge of lip 34, down the underside of lip 34 and onto moving surface 45; and finally, as molten material flows out of tray 31 onto moving surface 45, tray 31 is first brought up to operating level, as will be further explained later, and then subsequently continuously replenished with molten material from, for example, a heated holding vessel (21 in FIGURE 2) so as to maintain a constant level of molten material in tray 31.

It will be obvious that, in following the above procedure for setting the apparatus of FIGURE 3 into use, the actual foil manufacture does not start until stop-bar 44 is lowered. It will also be obvious that the foil produced immediately after stop-bar 44 is lowered will vary in thickness until the molten material in tray 31 is brought to operating level and until stable flow and temperature conditions have been established. Hence, it will be understood that as a consequenc of the starting procedure uniform foil of the desired thickness is not produced until a certain amount of non-uniform foil has been produced. However, it will also be understood that this "start-up" foil, although ultimately rejected, first serves purpose in allowing the various foil-handling and foil-guiding means which lead the foil from the coating roll to the storage roll (11 and 15, respectively, in FIGURE 2) to be "threaded" without undue concern as to possible damage to the foil in the "threading" procedure. It will not yet be fully understood how, when stop bar 44 is lowered causing molten material to flow over lip 34, the foil forming starts. Nor will it yet be understood how, after the foil has started forming, flow and temperature conditions stabilize so as to allow formation of uniform foil. Nor, moreover, will it yet be understood what various factors ultimately determine the width, thickness, quality and production rate of the foil. All these matters are discussed below.

Attention is now directed to FIGURE 4 which shows the lip and heater-bar portion of the apparatus of FIGURE 3 in such a manner as to allow critical dimensions to be identified and so as to illustrate the flow of molten-material over the lip and onto the moving-surface. With reference to FIGURE 4 and in obvious relationship to FIGURE 3, 51 is the heater bar, 52 is the lip, 53 is the upper section of the mouth M, 54 is the outer section and 55 is the inner-section of lip 52 and 56 is a portion of the moving surface. With further reference to FIGURE 4, 57 is molten-material, 58 is solidifying molten-material which is to say semi-molten foil, 60 is the thickness of the channel 61 between upper-section 53 and upper portion of outer-section 54, 62 is the size of coating-gap 63 between the lower portion of outer section 54 of lip 52 and moving surface 56 and 64 is the height of molten material 57 in the reservoir tray (31 in FIGURE 3) above the extremity of lip 52.

It will be readily apparent from FIGURE 4 and from elementary hydromechanical principles that the rate of flow of molten material 57 through channel 61 depends largely upon (a) viscous properties of the molten material 57, (b) the thickness 60 of channel 61, and (c) height 64 of molten material 57. Hence it will be understood that (a), (b) and (c) above must be constant for the above mentioned rate of flow to be constant. It will also be readily apparent from FIGURE 4 that the rate of flow of molten material 57 down the underside of lip 52 and onto moving surface 56 depends upon the rate of flow through channel 61. Hence it will be understood that the thickness 65 of solidifying-molten-material 58 depends largely upon (a), (b) and (c) above and upon the speed of moving surface 56 and that, therefore, these four things must be constant for thickness 65 to be constant. Hence, further, it will be understood that the size 62 of coating-gap 63 does not directly influence thickness 65 so long as gap 62 is not less than a certain amount nor greater than another certain amount. In this latter connection it will be obvious that gap 62 must not be so small as to restrict the flow of molten material nor so large as to cause the molten material to withdraw from moving surface 56 so as then to drip rather than flow from lip 52 onto moving surface 56. Also in the same connection, it will be equally obvious that the thickness 65 cannot be greater than a certain amount in relation to gap 62 which is to say the speed of moving surface 56 must be greater than a certain amount in relation to the rate of flow of molten material through channel 61 which is, of course, further to say that the speed of moving surface 56 must be sufficient to convert into foil all the molten material flowing through channel 61.

In illustration of the above, the following figures for dimensions 60, 62 and 64 and speed of moving surface 56 of FIGURE 4 are typical for copper foil manufacture; thickness 60 about 5 thousandths of an inch; gap 62 between 20 and 80 thousandths of an inch; height 64 about 4 inches; and speed of moving surface 56 between about 1 and 10 inches per second for foil thicknesses between, respectively, 10 and 1 thousandths of an inch.

For the purpose of explaining how width of foil is determined attention is now directed to FIGURE 5 which is a front view of the apparatus of FIGURE 3. With reference to FIGURE 5 and in obvious connection with FIGURE 3, 70 is the heater bar, 71 is the upper section of the mouth construction, 72 is the outer section of the lip, 73 is inner section of the lip and 74 is the moving surface. As already mentioned in connection with FIGURE 3, inner section 73 is of material which is not wet by the molten material whereas outer section 72 of the lip is of material which is wet by the molten material. Hence it will readily be understood that molten material flowing down the under-side of the lip is confined to the outer section section 72 and further, that in the region 75 where the molten material flows onto the moving surface 74 the molten material has a width 76 that is approximately equal to the width of outer section 72. Actually, the width 76 of the molten material is slightly greater than the width of outer section 72. However, it will of course be understood that width 76 will vary in minor fashion depending upon such things as coating gap size (62 in FIGURE 4), speed of the moving surface 74 and adhesive properties of moving surface 74, and may in certain circumstances be somewhat less than the width of lower outer section 72. In the case of copper foil manufacture, for example, over the range of gap widths and moving surface speeds previously exampled above, the variation in foil width does not exceed a quarter of an inch for an outer section 72 width of sixty inches, which is to say, depending on thickness, the width of the foil not more than a quarter of an inch less nor more than sixty inches, neglecting of course thermal contraction on cooling.

The above discussed effects of the dimensional and other factors of the apparatus of FIGURE 3 on the dimensional properties of the foil obviously depend upon the molten material remaining molten at least until making contact with the moving surface. This is to say, referring again to FIGURE 5, the material in region 75 will be entirely molten except, possibly, for the very thin portion of region 75 which is in contact with and adjacent to the moving-surface.

In order to better explain this important aspect of the operation of the liquid-coating-apparatus of FIGURE 3, attention is now directed to FIGURE 6 which is a simplified cross-sectional view of the molten-material-flow onto the moving-surface, illustrating the solidification of the flowed-molten-material into foil. Referring to FIGURE 6 and in obvious connection with FIGURE 4, 80 is the underside of the lip, 81 is the moving surface, 82 is molten-material and 83 is solidified-molten-material. It will be noted that the solidified molten material 83 does not attain the foil thickness 84 for some distance removed from the initial point of contact 85 of the molten material 82 with the moving surface 81. This distance 86, it will readily be understood, depends mainly upon such main factors as the temperature of the molten material 82 before contact with the moving surface, the rate of flow of molten-material 82, the heat conductive properties of molten material 82, the temperature of moving surface 81 before making contact with molten material 82, the heat conductive properties of moving surface 81 and the speed of moving surface 81. Accordingly, it will also be readily understood that actual determination of distance 86 under a given set of conditions is an extremely complex matter. However it will be equally understood that distance 86 is not a critical factor in the foil-manufacturing-process so long as distance 86 is not greater than a certain amount and not less than another certain amount. In this connection, obviously distance 86 must not be so large that solidification is incomplete by the time the foil is stripped from the moving surface and obviously also distance 86 must not be so small that solidification proceeds to an extent greater than foil thickness in the region that molten material flows from underside of lip 80 onto moving surface 81. It should be noted also, in connection with the solidification of molten material on moving surface 81 and in connection with distance 86, that the condition shown in FIGURE 6 of solidification commencing substantially immediately on contact of the molten material with the moving surface indicated by arrow 87 is the normal preferable condition. This is to say the temperature of the molten material flowing down the underside of the lip, the temperature of the moving surface before contact with the molten material and the various relevant heat-conductive factors are normally preferably such that solidification commences in the region that molten material forms a bridge between the underside of the lip and the moving surface. This is further to say, of course, that aside from limiting distance 86 to more than the minimum and less than the maximum as stated above the heat supplied to the molten material by the heater bar (38 in FIGURE 3) and the heat supplied to or extracted from the moving surface by the solidification means (mentioned in connection with FIGURE 2) would preferably be regulated so as to ensure that solidification commences in the aforementioned bridge region or closely thereafter. It will be more or less readily understood that the reason for preferring that solidification commences in the bridge region or closely thereafter rather than at some distance thereafter is to avoid the "globulating-effect" difficulty mentioned earlier. Obviously, in the absence of a solidified-molten-material layer between the non-adherent moving surface and the molten-material-layer there is normally a strong tendency for the molten material to globulate on the moving surface once out of the bridge-region. This tendency of the molten material to globulate on the moving surface of course depends critically upon the surface tension properties of the molten-material, upon the adhesive properties of the moving-surface with respect to the molten-material and upon other factors such as the presence of gas in the molten-material and so it is not invariably true that globulation automatically occurs if solidification does not commence in the bridge region or closely thereafter. However, even if globulation does not occur, if solidification does not commence in the bridge region there is almost invariably an action resulting in a sporadic variation in the width of the foil and so the advantage of ensuring that solidification commences in the bridge region or closely thereafter in the general case will be understood.

The above discussion with reference to FIGURES 3, 4, 5 and 6 has revealed the main factors governing the design and use of liquid-coating-apparatus for manufacturing foil in accordance with the present invention. That is to say it will by now be understood which features of the apparatus design and use are critical in determining foil properties, which features are non-critical but required to fall within prescribed limits and which features are substantially noncritical. It remains therefore only to discuss features of the molten-material itself which, as mentioned earlier, can have significant influence on the manufacture of foil in accordance with the present invention.

Apart from the non-corrosive, wetting or non-wetting and adhesive properties of the molten material previously mentioned in connection with the construction of suitable apparatus, it will by now be more or less obvious that consistent, uniform viscous and surface-tension properties are also ideally required of the molten-material used for manufacturing foil in accordance with the present invention. Thus, with reference again to FIGURE 4, variation in the rate of flow through channel 61, either from time to time or at the same time across the breadth of channel 61, results, respectively, from substantial inconstancy or substantial non-uniformity in the flow properties of the molten-material and causes variation in foil thickness, respectively, along the length or across the width of the foil. Thus, too, substantial variation in the surface-tension properties of the molten material cause variation in foil thickness at the edges of the foil. As is well known both the viscous properties and the surface-tension properties of the molten material are affected by temperature and so well regulated and smoothly maintained temperature conditions are prerequisite for consistent and uniform flow and surface tension properties.

It should be noted that, for foil manufacturing purposes, over and above this temperature effect on flow and surface tension properties is the effect on these properties of impurities in the molten material, especially, in the general case the effect of occluded gases. Hence it will be understood that not only from the point of view of obtaining desirable corrosive, wetting or non-wetting and adhesive properties are impurities in the molten material generally undesirable for foil manufacturing purposes as previously discussed, but also from point of view of obtaining consistent, uniform flow and surface tension properties. It will also be understood that, generally speaking, in manufacturing foil from molten-material in accordance with the present invention the purer the molten material, particularly in respect of occluded gases, the more consistent and uniform is the quality of the foil. Moreover, it will be understood that, again generally speaking, if a certain impurity level is unavoidable in the molten material then this impurity level should desirably be reasonably consistent and uniform. Furthermore, it will be understood that contamination of the molten material prior to coating on the moving surface, as for example by exposing the molten material to an atmosphere which either substantially reacts with, dissolves in or occludes in the molten-material is preferably to be avoided. In this latter connection the importance of the contamination-avoiding atmosphere previously discussed with reference to FIGURES 1 and 2 will by now be well understood. According to my invention either vacuum or an inert atmosphere may be used.

In particular illustration of the effects of impurities in the molten-material upon the foil manufacturing process in accordance with the present invention it may be noted, for example, that oxygen, whether dissolved, occluded or present as oxide, even in relatively small amounts generally substantially affects corrosive properties and, in turn, wetting and non-wetting and adhesive properties. It may be also noted, for example, that any gases whatsoever which are occluded in the molten material in form of bubbles, however small, generally have very pronounced effect on viscous and surface-tension properties. In this latter connection it may be further noted that dissolved gases or gases which are occluded in the molten material not in bubble form can both readily convert to occluded bubble-form in response to such temperature and pressure changes as result from thermal or other motion of the molten-material during the foil manufacturing process.

From the above it will be understood that in the case of copper foil and strip, for example, a preferred source material is molten-electrolytically-refined copper from which oxygen and dissolved and occluded gases have been substantially removed as, for example, by successive hydrogen-treatment and vacuum-treatment. It may be finally noted that the substantial removal of oxygen and dissolved and occluded gases from the electrolytically refined copper results not only in desirable properties in the molten-copper insofar as the foil and strip manufacturing process itself is concerned but also in desirable properties in the copper foil and strip such as freedom from embrittlement-tendency, freedom from mechanical defects such as porosity and pinholes, and high electrical conductivity.

I claim:
1. The method of manufacturing sheetlike material comprising flowing liquid material out of a container in a continuous stream, through an elongated channel, thence over a surface which is wet by said liquid material, and thence onto a moving surface, forming a bridge of said material between said wet surface and said moving surface, solidifying said flowed liquid material on said moving surface and stripping said solidified material from said moving surface.

2. The method of claim 1 in which the wet surface is substantially the width of the sheetlike material.

3. The method of claim 1 wherein the sheetlike material is metal and the liquid material is molten metal which is maintained in the molten state in the region where it forms a bridge between the wet surface and the moving surface except that in the region of the bridge adjacent to the moving surface said metal is solidified to a thickness not exceeding the thickness of the desired sheetlike metal.

4. The method of claim 1 wherein the temperature of the liquid material is regulated while it flows over the wet surface so as to prevent solidification in at least part of the region where the flowing material forms a bridge between the wet surface and the moving surface.

5. The method of claim 1 wherein the temperature of the liquid material is regulated while it flows through the channel so as to prevent solidification in at least part of the region where the flowing liquid material forms a bridge between the wet surface and the moving surface.

6. The method of claim 1 wherein the sheetlike material is copper, the liquid material is substantially gas-free molten copper, the liquid material is heated in the container and the liquid material is heated again before it forms the bridge.

7. The method of causing a material to assume solid sheetlike form comprising flowing said material in liquid form out of a container, through an elongated channel, over a surface which is wet by said material in liquid form, and onto a moving surface; forming a bridge between said wet surface and said moving surface, said bridge having an upper region of said material in liquid form; heating said upper region to maintain said material in liquid form in said upper region; solidifying said material on said moving surface; and stripping said solidified material from said moving surface.

8. The method of claim 7 wherein the material is molten metal and the method is carried out in an inert atmosphere.

9. The method of claim 7 wherein the material is molten metal and the method is carried out in a vacuum.

10. The method of claim 7 wherein the liquid material is heated in the container by a first heat source, and heated while it flows over the wet surface by a second heat source independent of the first heat source.

11. Apparatus for manufacturing foil and strip including a container for liquid, a first surface which is wet by the liquid and which has an upper part and a lower part, a channel for conducting a stream of the liquid from the container to the first surface, a second surface which moves in relation to the said lower part, the width of the first surface extending across the width of the second surface, whereby the flowing liquid forms a bridge between said two surfaces across the full width of the first surface and across at least part of the width of the second surface, means for solidifying the flowed liquid material on the second surface as the flowed material is drawn out of the bridge by the movement of the second surface, and means for removing the solidified material from the second surface.

12. Apparatus as in claim 11 wherein the channel and the first surface are integral with the container.

13. Apparatus as in claim 11 wherein the second surface is the outer surface of a constantly rotating cylindrical drum.

14. Apparatus as in claim 11 wherein the solidifying means is means for regulating the temperature of the second surface.

15. Apparatus for manufacturing copper foil and strip including a heated container for containing molten copper; a heated first surface of material which is wet by molten copper, said first surface having a lower part and an upper part; a heated channel for conducting a stream of molten copper from said heated container to the upper part of the first surface so as then to cause the copper to flow from the upper part to said lower part while spreading throughout the width of the first surface; a second surface moving in spaced relation to said lower part of the first surface so that the molten copper flowing down the lower part of the first surface forms a bridge of molten copper between said lower part of the first surface and the second surface; means for regulating the temperature of the second surface so that as molten copper is carried away from the bridge by movement of the second surface solidification proceeds to form a coating of solid copper on the second surface at some distance from the bridge, said solid coating being joined into the molten copper bridge by a coating of partly liquid and partly solid copper; means for continuously removing the coating of solid copper from the second surface; and an atmosphere of gas which neither substantially reacts with nor dissolves in nor occludes in said molten copper, whereby atmospheric contamination of the copper while the copper is being contained, flowed solidified and removed is avoided.

16. Apparatus for manufacturing sheetlike material, including: a container for liquid material; a first surface having a first section which is wet by said liquid material and a second section which is not wet by said liquid material, an elongated channel for conducting the liquid material from the container to the first surface; a second surface which moves in spaced relation to the first surface whereby the liquid material flows from the first surface to the second surface and forms a bridge between the two surfaces; means for solidifying the liquid material on the second surface as the liquid material is drawn out of the bridge by the movement of the second surface, and means for removing the solidified material from the second surface.

17. Apparatus as in claim 16 wherein the material is copper, the first section of the first surface is of a refractory metallic material containing tungsten and the second section of the first surface is of a refractory metallic material containing molybdenum.

18. Apparatus as in claim 16 wherein the width of the first section of the first surface is substantially equal to the width of the sheetlike material.

19. Apparatus for manufacturing sheetlike material, including: a container for liquid material; a first surface; an elongated channel for conducting the liquid material from the container to the first surface; a second surface which moves in spaced relation to the first surface whereby the liquid material flows from the first surface to the second surface and forms a bridge between the two surfaces; means for heating at least part of the liquid material forming the bridge; means for solidifying the liquid material on the second surface as the liquid material is drawn out of the bridge by the movement of the second surface; and means for removing the solidified material from the second surface.

20. Apparatus as in claim 19 in which the heating means is adjacent to a wall of the elongated channel.

21. Apparatus as in claim 19 in which the heating means is a resistance heating means adjacent to the first surface.

22. Apparatus for manufacturing sheetlike material, including; a container for liquid material; a first surface so constructed that the liquid flows over a downwardly facing section of said first surface; an elongated channel for conducting the liquid material from the container to the first surface; a second surface which moves in spaced relation to the first surface whereby the liquid material flows from the first surface to the second surface and forms a bridge between the two surfaces; means for solidifying the liquid material on the second surface as the liquid material is drawn out of the bridge by the movement of the second surface; and means for removing the solidified material from the second surface.

23. Apparatus as in claim 22 in which the first surface is in the form of a lip having a downwardly facing section which is partially cylindrical in shape.

24. Apparatus for manufacturing sheetlike material, including: a container for liquid material; a first surface; an elongated channel for conducting the liquid material from the container to the first surface, said channel having opposing walls conforming with each other in shape, said walls being precisely spaced apart to restrict and distribute uniformly the flow of liquid between the walls; a second surface which moves in relation to the first surface whereby the liquid material flows from the first surface to the second surface and forms a bridge between the two surfaces; means for solidifying the liquid material on the second surface as the liquid material is drawn out of the bridge by the movement of the second surface; and means for removing the solidified material from the second surface.

References Cited

UNITED STATES PATENTS

| | | | |
|---|---|---|---|
| 3,316,586 | 5/1967 | Sommer | 18—15 |
| 3,322,523 | 5/1967 | Adler et al. | 65—193 XR |
| 1,025,848 | 5/1912 | Wagner | 164—77 X |
| 1,586,187 | 5/1926 | Ferngren | 65—193 X |
| 1,739,960 | 12/1929 | Ferngren | 65—90 X |
| 2,666,948 | 1/1954 | Guenther et al. | |
| 2,717,474 | 9/1955 | Barradell-Smith. | |
| 3,089,208 | 5/1963 | Scribner | 164—87 |
| 3,183,563 | 5/1965 | Smith | 164—250 |

FOREIGN PATENTS 266,182   2/1927   Great Britain.

J. SPENCER OVERHOLSER, *Primary Examiner.*

R. S. ANNEAR, *Assistant Examiner.*